United States Patent
Ganesan et al.

[11] Patent Number: 5,978,481
[45] Date of Patent: *Nov. 2, 1999

[54] MODEM COMPATIBLE METHOD AND APPARATUS FOR ENCRYPTING DATA THAT IS TRANSPARENT TO SOFTWARE APPLICATIONS

[75] Inventors: Ramanan V. Ganesan, Hillsboro; Vijay Rao, Portland, both of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/841,472

[22] Filed: Apr. 22, 1997

Related U.S. Application Data

[63] Continuation of application No. 08/291,160, Aug. 16, 1994, abandoned.

[51] Int. Cl.[6] ............................. H04N 1/44; H04L 9/00
[52] U.S. Cl. ................................. 380/18; 380/49
[58] Field of Search ................ 380/18, 49; 375/222, 375/220, 370; 379/93.28, 93.29, 93.31, 93.32, 93.34, 100.01, 100.06, 100.12, 100.17, 102.02, 102.04

[56] References Cited

U.S. PATENT DOCUMENTS

| | | | |
|---|---|---|---|
| 4,074,066 | 2/1978 | Ehrsam et al. | 380/29 |
| 4,078,152 | 3/1978 | Tuckerman, III | 380/29 |
| 4,172,213 | 10/1979 | Barnes et al. | 380/29 |
| 4,405,829 | 9/1983 | Rivest et al. | 380/30 |
| 4,597,082 | 6/1986 | Hill et al. | 371/32 |
| 4,661,657 | 4/1987 | Grenzebach et al. | 380/21 |
| 4,731,840 | 3/1988 | Mniszewski et al. | 380/21 |
| 4,815,130 | 3/1989 | Lee et al. | 380/50 |
| 4,926,448 | 5/1990 | Kraul et al. | 375/121 |
| 4,953,210 | 8/1990 | McGlynn et al. | 380/48 |
| 5,062,136 | 10/1991 | Gattis et al. | 380/18 |
| 5,142,578 | 8/1992 | Matyas et al. | 380/21 |
| 5,146,472 | 9/1992 | Hallman | 375/8 |
| 5,160,926 | 11/1992 | Schweitzer, III | 340/870.02 |
| 5,224,154 | 6/1993 | Aldridge et al. | 379/93 |
| 5,369,703 | 11/1994 | Archibald | 380/9 |
| 5,410,599 | 4/1995 | Crowley et al. | 380/9 |
| 5,416,842 | 5/1995 | Aziz | 380/30 |
| 5,493,609 | 2/1996 | Winseck et al. | 379/96 |
| 5,497,422 | 3/1996 | Tysen et al. | 380/25 |
| 5,517,569 | 5/1996 | Clark | 380/52 |
| 5,546,463 | 8/1996 | Caputo et al. | 380/25 |
| 5,579,394 | 11/1996 | Waldron, Jr. et al. | 380/49 |

*Primary Examiner*—Tod R. Swann
*Assistant Examiner*—Hrayr A. Sayadian
*Attorney, Agent, or Firm*—Blakely, Sokoloff, Taylor & Zafman LLP

[57] ABSTRACT

A method and apparatus for transmitting encoded data from one computer system to another using an AT command set compatible communication device is described. Data being sent from a communications application to the AT command set compatible communication device is monitored, and encryption is performed in response to detecting a connect message and a carrier detect signal received from the communication device and changing in response to said detection the state of an encryption application from a first state to a remote state and the data is encrypted using a stream encryption scheme before it is passed to the communication device. When a break sequence is detected or a carrier detect signal is deasserted, encryption is ceased thus having the encryption application automatically return to the first state.

21 Claims, 7 Drawing Sheets

| State | Next Character | Action Routine | Next State | Default State |
|---|---|---|---|---|
| 0 | '\r' | Null | 1 | 0 (Default) |
| 1 | '\n' | Null | 2 | 0 |
| 2 | 'C' | Null | 3 | 0 |
| 3 | 'O' | Null | 4 | 0 |
| 4 | 'N' | Null | 5 | 0 |
| 5 | 'N' | Null | 6 | 0 |
| 6 | 'E' | Null | 7 | 0 |
| 7 | 'C' | Null | 8 | 0 |
| 8 | 'T' | Null | 9 | 0 |
| 9 | '\r' | Null | 10 | 9 |
| 10 | '\n' | CONNECT_RESP | 0 | 0 |

MODEM COMPATIBLE METHOD AND APPARATUS FOR ENCRYPTING DATA THAT IS TRANSPARENT TO SOFTWARE APPLICATIONS

This is a Continuation Application of application Ser. No. 08/291,160, filed Aug. 16, 1994 now abandoned.

BACKGROUND OF THE INVENTION

1. Field of the Invention

The described invention relates generally to the field of data communications. More particularly, the invention relates to a method and apparatus for encrypting data that can be used with standard software communication applications using modems.

2. Prior Art

The use of a modem in combination with a standard telephone line is a common method for exchanging data between computer systems. Modems use a standard communication interface that allows modems from different manufacturers to communicate with each other. The "Advanced Technology" command set has also become a defacto standard command language with which computer systems can control a modem. This combination of a standard command language and a standard interface allows modems made by different manufacturers to provide communication capability with computer systems which are also from different manufacturers. This compatibility gives a user the ability to purchase computers and modems based on price and quality considerations only, and therefore is desirable.

Most recently, modems have been developed which operate over cellular networks using standard cellular phones. In addition, AT compatible modems have been developed that operate over the radio network.

The use of a modem with a highly compatible interface creates some security risk, however, because anyone able to detect the signals used by the modems to exchange information can determine the contents of that information. In the past, this security risk has been minimized by the relatively high degree of privacy offered by a standard phone line. The use of cellular telephones as a substitute for traditional telephones, however, has removed this at least somewhat satisfactory degree of security because the signals carrying the information being exchanged are broadcast where they can be detected by anyone so inclined. Thus, the use of a cellular telephone for data communication between computer systems has created the need to make the information transmitted by the cellular telephone unreadable to anyone other than the intended recipient.

The growing presence of mobile computing involving portable computers and wireless data communications poses a considerable threat to corporate security since wireless communications are vulnerable to interceptions. The communications software used with these portables relies on simple passwords to protect access to the network and the login script generally holds the password in plain text. In other words, the stolen portables gives the thief an easy access to the network. Even some applications that use encryption do not employ a strong encryption scheme.

Encryption provides one method for making the information transmitted by modems unreadable to anyone other than the intended recipient. While modems that provide encryption capability exist, the encryption feature cannot be utilized unless the receiving modem also possesses the same encryption capability. This requirement eliminates much of the desired compatibility previously offered by modems that did not posses encryption capability. Additionally, this hardware-based solution adds to the cost of the modem. Alternatively, communication software programs may incorporate an encryption feature, however, this requires the two computer systems communicating with each other to utilize communication software applications that incorporate the same encryption method. Once again, this reduces users choices and eliminates the previously established compatibility among computer systems. Thus, it is desirable to have a method and apparatus of encrypting data that allows various standard computer systems, software applications, and modems to be used interchangeably and which can be uniformly applied with modems that operate over cellular networks, radio networks and regular telephone lines.

BRIEF SUMMARY OF THE INVENTION

The present invention pertains to an apparatus and method for data encryption for a computer system communicating via a modem. When a communication application running on the computer system attempts to write data to the modem, the transaction is intercepted and the data is observed. If the data contains commands being issued to the modem, the data is passed onto the modem directly without encryption. Otherwise the data is encrypted before being sent to the modem. The modem then transmits the data in a normal fashion to a remote modem to which it is connected. Immediately after the connection is established with the remote modem, an encryption key for a session is generated randomly and securely transmitted to the remote end using the RSA public-key cryptography technology. When the remote modem receiving the encrypted data attempts to provide the encrypted data to a remote software application, this transaction is also intercepted and the data is decrypted before being provided to the remote software application. The encryption scheme works transparent to the application and requires no changes to the existing applications.

In accordance with one aspect of the invention, an encrypted data stream is generated by performing an exclusive-or operation on an information data stream and an encryption data stream. The encryption data stream is generated by performing a Data Encryption Standard ("DES") encryption operation on the encrypted data stream utilizing an encryption key. A special startup sequence is utilized while new data for the encryption data stream is being generated.

DETAILED DESCRIPTION OF THE INVENTION

An apparatus and method for encrypting data transmitted by a computer system through a modem is described in detail. In the following description for purposes of explanation, specific details such as interrupt configurations, hardware components, communication devices including AT mobidems, etc., are set forth in order to provide a thorough understanding of the present invention. However, it will be apparent to one skilled in the art that the present invention may be practiced without these specific details including the use of standard modems. In other instances, well known structures, devices, functions, and procedures are shown in block diagram form in order to avoid obscuring the present invention. It should be noted that the present invention can be applied to a variety of different processor architectures. Furthermore, the various systems that make up the invention can be practiced in a variety of manners such as through the use of hardware and software encoding mechanisms.

Figure 1:
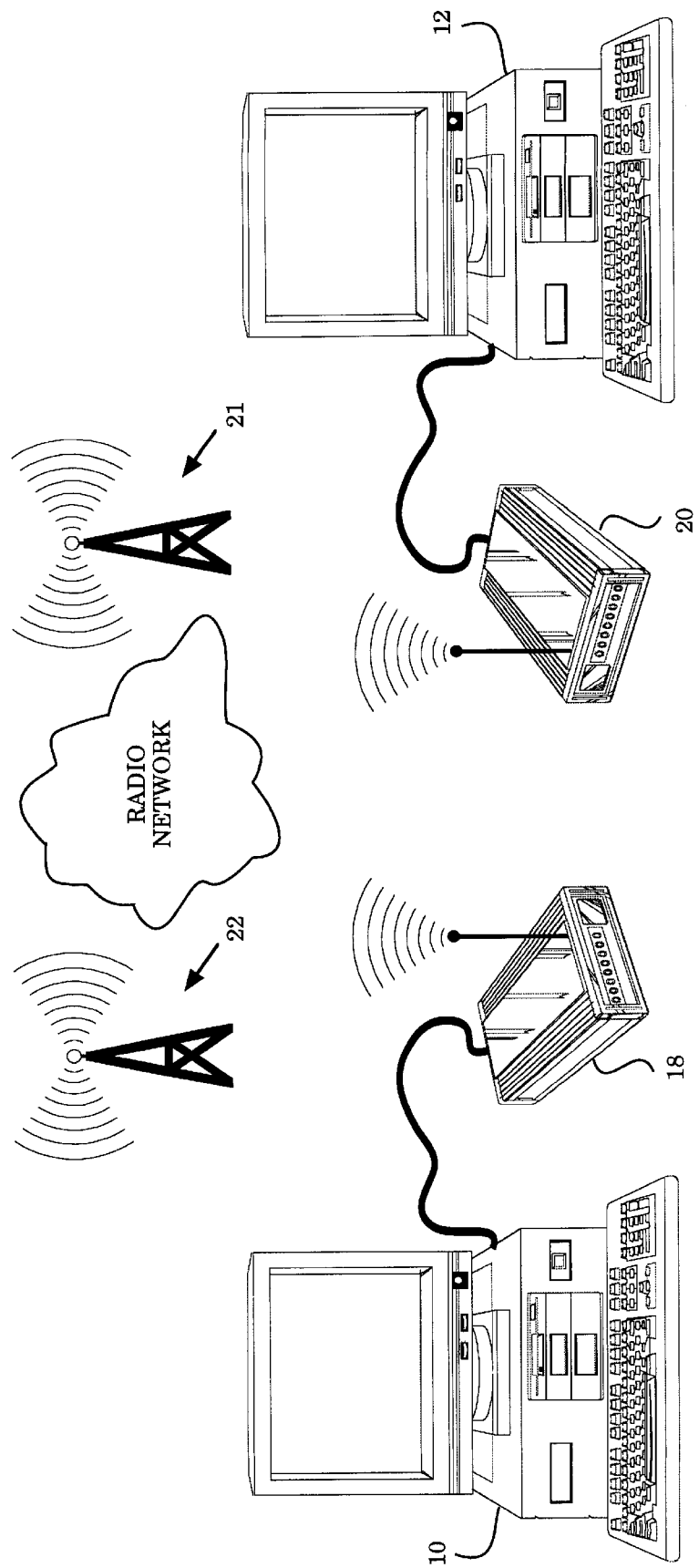
FIG. 1 is an illustration of two computer systems communicating in accordance with one embodiment of the invention.

Referring now to FIG. 1, two computer systems 10 and 12 communicating via AT mobidems 18 and 20. AT mobidems 18 and 20 are modems that utilize the AT command set combined with radio transmitter-receivers. While the modem function and the transmitter-receiver function are shown incorporated into a single system, the two functions could be performed by two separate systems. The radio signals generated by AT mobidem 18 in response to digital signals from the computer system 10 are transmitted to the nearest base station 22 of the radio network. The base station 22 transmits the information to the radio network which in turn sends the information to the base station 21 closest to the remote mobidem 20. The remote mobidem 20 receives the signals from the base station 21 and, converts the signals back into digital signals that can be processed by computer system 12. As the radio signals propagate from the mobidem to the base station 22 and from the base station 22 to the radio network, the radio signals can be monitored and understood by anyone who possesses the proper equipment.

As with standard modems, AT mobidems 18 and 20 are in a command mode when initially activated. In the command mode, the mobidems are controlled via the AT command set of instructions. Further in the command mode, all data received by AT mobidems 18 and 20 is interpreted as commands and can cause the mobidems to change states and to perform certain operations, such as dialing a phone number. Once a connection is established between AT mobidems 18 and 20, the mobidems enter data mode. When in data mode, AT mobidems 18 and 20 exchange data sent to them from computer systems 10 and 12 respectively. Data received from the other AT mobidem is provided by AT mobidems 18 and 20 to the computer systems to which they are connected. Unless a special "break" sequence of data is provided within a predetermined set of time intervals, the data received from computer systems 10 and 12 will not alter the state of AT mobidems 18 and 20, or cause them to leave data mode. Additionally, AT mobidems 18 and 20 both assert a carrier detect signal (CD) when in data mode as per the AT command set protocol, indicating that the mobidems are in communication with another modem or mobidem.

Figure 2:
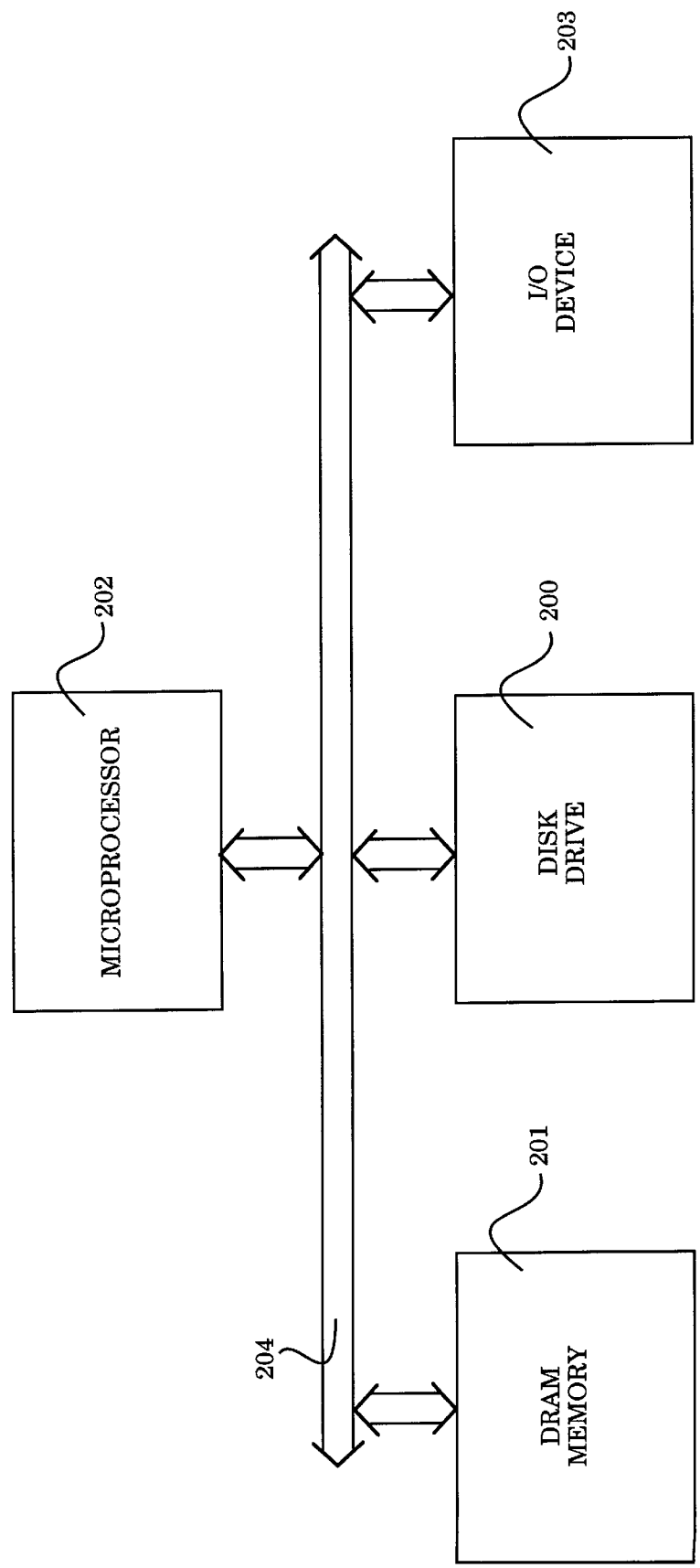
FIG. 2 is a block diagram illustrating a computer system configured in accordance with one embodiment of the invention.

FIG. 2 is a block diagram of a computer system configured in accordance with one embodiment of the invention. In this embodiment, application programs and "terminate and stay resident" ("TSR") programs are stored on disk drive 200. These programs are loaded into DRAM memory 201 by microprocessor 202 once the computer is activated and the programs are run. TSR programs are utilized in the DOS® operating system environment and remain in memory while application programs are running. TSR programs detect when certain events such as an input/output transaction take place within the computer system and then take predetermined action in response. Other operating systems including Macintosh® System 7® software allow similar "background" software to be incorporated into their system. Microprocessor 202 receives instructions from the application programs located in DRAM 201 which, on occasion, cause microprocessor 202 to perform read and write operations to input/output ("I/O") device 203 through system bus 204.

Figure 3:
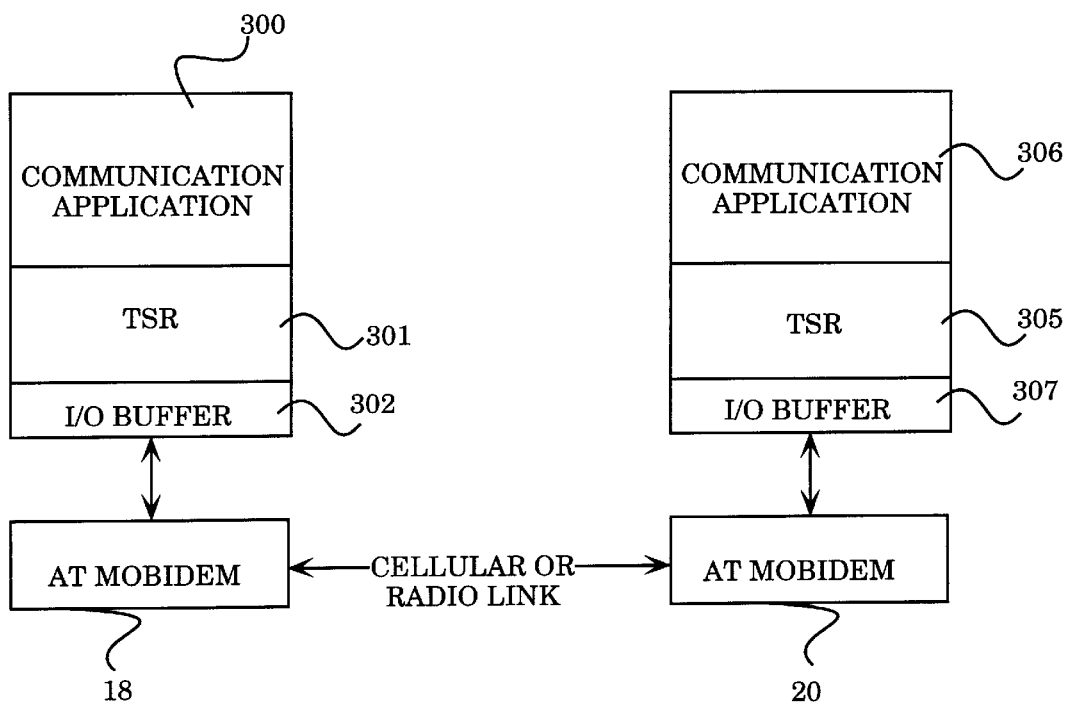
FIG. 3 is a block diagram that illustrates the interaction of the various systems of the computer systems shown in FIG. 1 when configured in accordance with one embodiment of the invention.

FIG. 3 is a block diagram illustrating the interaction of the various systems within computer systems 10 and 12 (FIG. 1) in communication with each other in accordance with one embodiment of the invention. In this embodiment, communication application 300 is a CC: Mail program from Lotus Development Corp., although other communication application programs such as terminal emulators or file transfer programs can be utilized. Communication application 300 communicates with input/output ("I/O") buffer 302 through TSR 301. Data passed to I/O buffer 302 is sent to AT mobidem 18 which is coupled via radio link to AT mobidem 20. AT mobidem 18 transmits the data to AT mobidem 20 via the cellular radio link, which passes the data to communication application 306 via I/O buffer 307 and TSR 305.

When configured in accordance with one embodiment of the invention, communication application 300 utilizes the INT 14 Application Program Interface ("API") call in an interrupt mode, as opposed to a polling mode, to perform input/output operations within computer system 10 (FIG. 1). The INT 14 API is a procedure within the DOS operating system environment to write or read data to or from one of the I/O ports. The four INT 14 API requests are as follows: INT 14 AH=0, DX=Port which initializes the specified COM port; INT 14 AH=1, AL=Char, DX=Port which writes a character to the specified COM port; INT 14 AH=2, AL=Char, DX=Port which reads a character from the specified COM port; and INT 14 AH=3, AL=Char, DX=Port which reads the COM port status. While there are other procedures and methods for performing I/O operations that could be utilized in other embodiments of the invention, the INT 14 API is the most commonly used and therefore is desirable. Other operating systems may have different methods for performing I/O operations that can be accommodated by a different embodiment of the invention including the DLL interrupt scheme in Microsoft™ Windows™.

When computer system 10 (FIG. 1) is configured in accordance with one embodiment of the invention, TSR 301 is placed in memory while communication application 300 is running. One method to accomplish this is to activate communication application 300 through a batch (.BAT) file that also activates TSR 301, and that de-activates TSR 301 once communication application 300 is de-activated. When communication application 300 attempts to conduct an I/O operation using the INT 14 API call, TSR 301 interrupts the operation and examines the data being transferred. TSR 301 monitors the data being sent between computer system 10 and AT mobidem 18 and changes state depending on the data detected. If a connection has been established with a remote modem, TSR 301 encrypts the data before passing the data on to I/O buffer 302. If no connection has been established, TSR 301 passes the data on without encryption to I/O buffer 302 so that communication application 300 may control AT mobidem 18.

Figure 4:
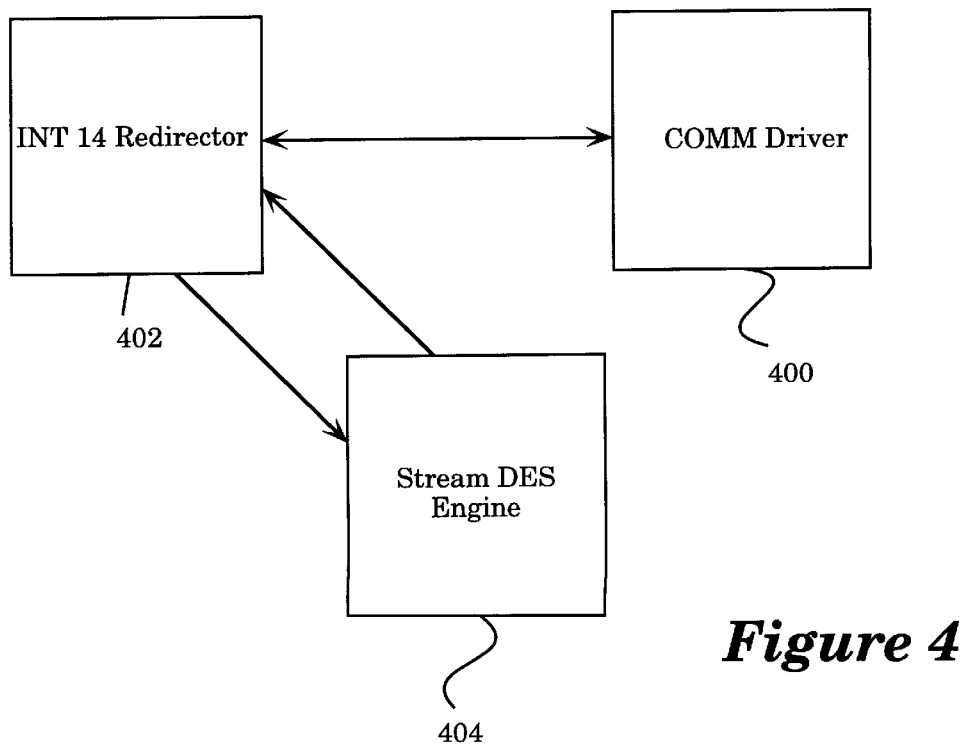
FIG. 4 is a block diagram illustrating the modules that make up TSR's 301 and 305 shown in FIG. 3.

FIG. 4 is a block diagram illustrating the three main modules that makeup TSR 301 (FIG. 3). The three modules are COMM driver 400, INT 14 redirector 402, and stream DES engine 404. COMM driver 400 is an interrupt driven serial port driver generally consistent with other drivers known in the art, that provides a simple procedural API for setting up a COM port with the necessary communication parameters and interrupt handling, as well as reading and writing characters from the COM port. Additionally, COMM driver 400 allows the normal interrupt handler to be restored and the COM port to be released. INT 14 redirector 402 receives data from COMM driver 400 and communication application 300 and either directs that data through DES engine 404 or passes the data on depending on whether INT 14 redirector 402 is in an encrypt or a no-encrypt mode. DES engine 404 encrypts and decrypts the data received from INT 14 redirector 402.

While generally consistent with other drivers known in the art, COMM driver 400 employs a special deadlock prevention mechanism which is useful when operating with communications software such as CC: Mail™ that ignores a "No Carrier" message provided by AT command set compatible communications devices when a connection with another communication device is broken. The No Carrier message indicates that the connection with another communications device is lost and that AT mobidem 18 is entering command mode. While TSR 301 will recognize this and change state accordingly as described below, communication application 300 may not, and may continue to send data to AT mobidem 18. If the data sent to AT mobidem 18 contains the character sequence that places AT mobidem 18 in echo mode, AT mobidem 18 will echo all data sent to it. This can cause an RTS (ready/request to send) signal that is asserted by computer system 10 when it is ready to receive data from AT mobidem 18 to be de-asserted when the input queue is full. The de-assertion of the RTS signal, in turn, causes AT mobidem 18 to de-assert a CTS (clear to send) signal used to indicate the RTS signal's readiness to receive data, creating a deadlock condition when COMM driver 400 reaches the transmit queue full condition. To prevent this deadlock, COMM driver 400 maintains the assertion of RTS when AT mobidem 18 is in command mode. The assertion of RTS causes AT mobidem 18 to maintain assertion of CTS, thus allowing all data sent by communication application 300 to be written to AT mobidem 18 preventing the output queue from filling up. This prevents the deadlock situation discussed above.

Figures 5, 6:
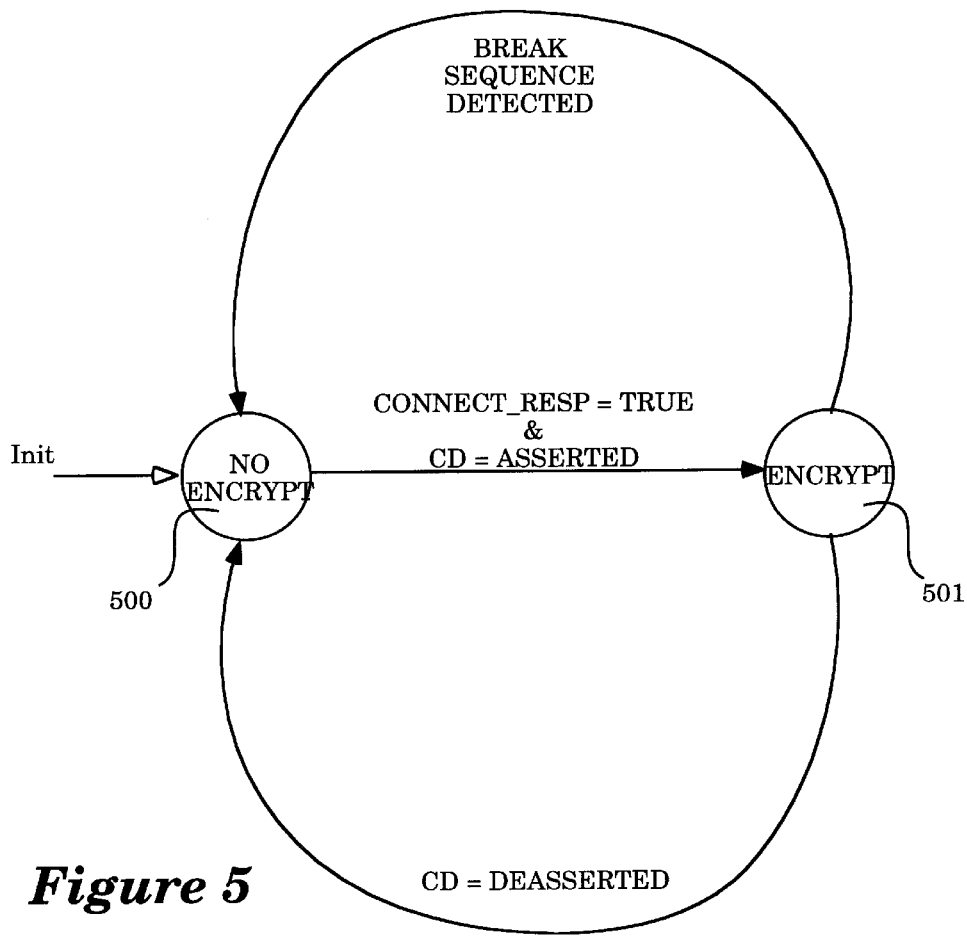
FIG. 5 is a state diagram illustrating the state transitions of TSR's 301 and 305 shown in FIG. 3.
FIG. 6 is a table illustrating the state transitions experienced by INT 14 redirector 402 in response to the detection of a connect message.

FIG. 5 is a state diagram illustrating the state transitions of INT 14 redirector 402 when configured in accordance with one embodiment of the invention. When INT 14 redirector 402 is activated, INT 14 redirector 402 is placed in the "no-encrypt" mode 500. In no-encrypt mode 500, INT 14 redirector 402 traps each INT 14 API input/output operation between communication application 300 and AT mobidem 18, tracks each byte of data sent and received, and passes the data on unencrypted. When AT mobidem 18 establishes a connection with AT mobidem 20, either through commands issued by communication application 300 or through a call received by the AT mobidem 18 from AT mobidem 20, AT mobidem 18 issues a "connect" message and assert the carrier detect ("CD") signal in accordance with the AT command set protocol.

When INT 14 redirector 402 detects the connect message, it sets the variable CONNECT_RESP to True. Once the CONNECT_RESP variable is set to True and the CD signal is asserted, INT 14 redirector 402 enters encrypt mode 501 where it directs all data it receives from either communication application 300 or AT mobidem 18 to stream DES engine 404. Stream DES engine decrypts the data received from AT mobidem 18 and encrypts data from communication application 300 before returning the data to INT 14 redirector 402. In addition to encrypting and decrypting while in encrypt mode 501, INT 14 redirector 402 tracks the data sent from communication application 300 for the status of the CD signal. If the CD signal is de-asserted, or the special break sequence of data is detected from communication application 300, INT 14 redirector 402 enters no-encrypt mode 500.

FIG. 6 is a table illustrating the state transitions that accompany the detection of a connect message that cause INT 14 redirector 402 to set the variable CONNECT_RESP to True. When commands are issued to AT mobidem 18 such that communication is established with AT mobidem 20, the AT command set requires the AT mobidem 18 to provide a connect result code that is configured as follows: "\r\nCONNECT*\r\n", where '*' indicates one or more characters. The symbol '\r' represents the line feed character and the symbol '\n' represents the return character. The characters that usually correspond to the asterisk are numbers that indicate the speed of the connection established. An example of a result code is as follows:

CONNECT 9600

Still referring to FIG. 6, when INT 14 redirector 402 is first activated, it is in state 0. As the first '\r' character is detected from ATM mobidem 18 (FIG. 1), INT 14 redirector 402 enters state 1. When the '\n' character is detected INT 14 redirector 402 enters state 2. As the 'C', 'O', and 'N' characters are detected, INT 14 redirector 402 enters states 3, 4 and 5 respectively. Should any of the characters received not be part of the expected connect message, INT 14 redirector 402 returns to the default state of 0. Once INT 14 redirector 402 reaches state 9 the default state also becomes state 9, and INT 14 redirector 402 remains in this state while the unknown characters that indicate the speed of the connection, and possibly other information, are received. When the final '\r' and '\n' characters are detected, INT 14 redirector 402 enters state 10, and then sets CONNECT_RESP to True. When the CONNECT_RESP variable is True, and the CD signal is asserted, INT 14 redirector 402 transitions from no-encrypt mode 500 to encrypt mode 501.

Figure 7A:
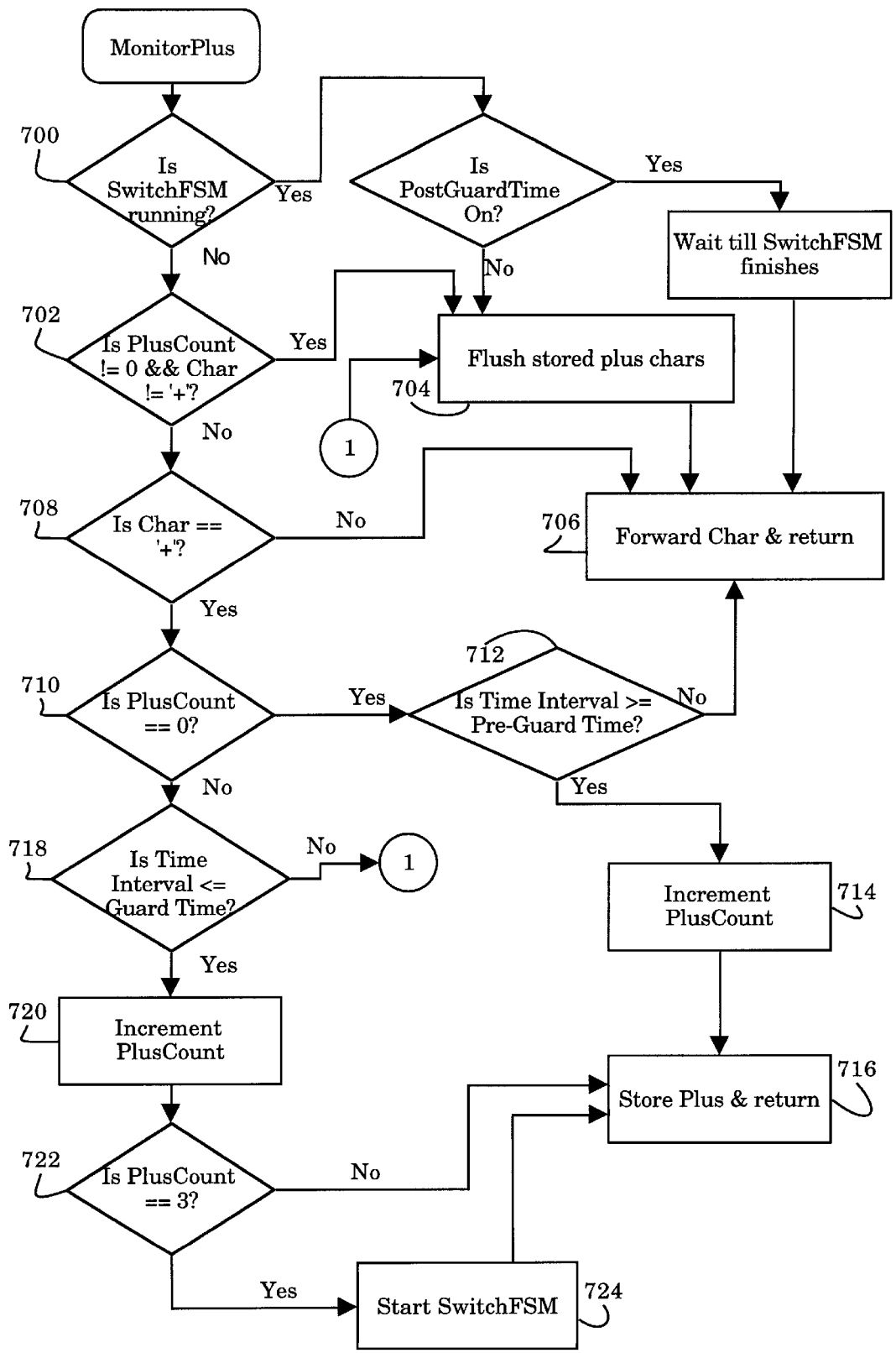
FIG. 7a and 7b are flow charts that illustrate the logic used to implement the default break sequence detection function.

FIG. 7a is a flow chart illustrating a procedure called MonitorPlus implemented by INT 14 redirector 402. MonitorPlus detects a break sequence issued from computer system 10 used to force AT mobidem 18 into command mode. When this sequence is detected MonitorPlus causes INT 14 redirector 402 to switch states, and sends on the unencrypted break sequence to AT mobidem 18 using the procedure switchFSM. When INT 14 redirector 402 is first activated, it assumes that AT mobidem 18 is utilizing the default break sequence of a one pause (guard time interval) followed by three '+' characters and another one pause (pre-post-guard time interval). This configuration may be changed by the user, however, by indicating a new default time and character set to TSR 301 and to AT mobidem 18.

The MonitorPlus procedure tracks each character sent by communication application 300 to AT mobidem 18. For each character received MonitorPlus first determines if the procedure switchFSM is running at step 700 indicating that a full escape sequence has previously been detected and that AT mobidem 18 is being placed in command mode. If switchFSM is not running, MonitorPlus determines at step 702 if something other than a plus character is being sent and the variable PlusCount is not equal to zero. If both of these conditions are true, any previously encountered plus characters are flushed at step 704 and a "forward char and return" operation is performed at step 706. Otherwise, MonitorPlus determines at step 708 if something other than a plus character is being transmitted and, if not, a simple forward char and return operation is performed at step 706. If at step 708 it is determined that plus character is being transmitted and it is then determined at step 710 that PlusCount is zero. The procedure determines at step 712 if the present time interval is greater than the guard time. If the present time interval is greater than the guard time, then the PlusCount is incremented at step 714 and the plus character is stored. The procedure then returns to step 716. If the plus count is not zero, the procedure determines at step 718 if the present time interval is less than or equal to the guard time. If the present time interval is greater than the guard time, than the procedure flushes the stored plus characters and performs a forward char and return operation. If the time interval is less than or equal to the guard time at step 722, the plus count is incremented at step 720. If the plus count equals three, switchFSM is initiated at step 724. Otherwise, the plus character is stored and the program returns.

Figure 7B:
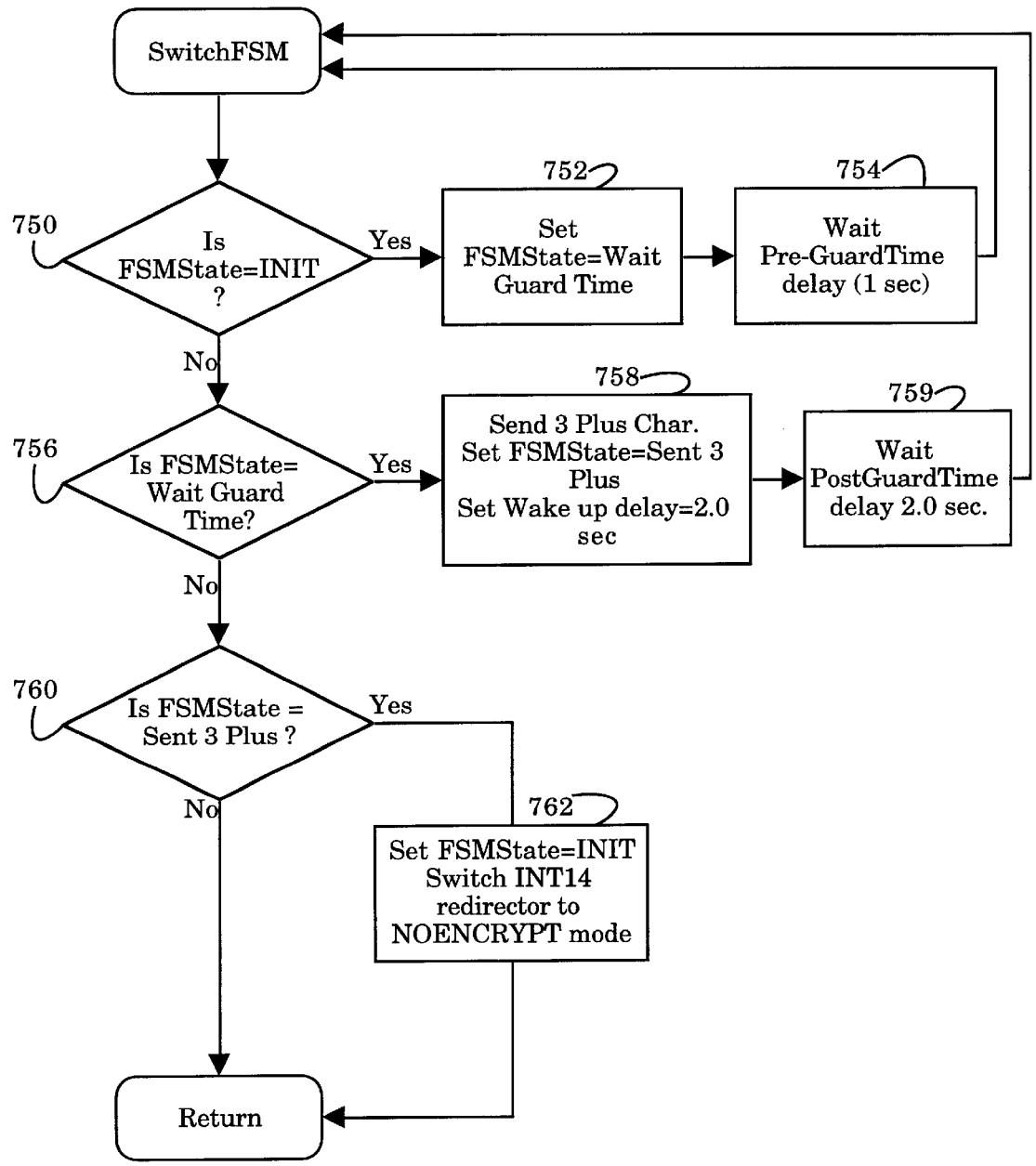

FIG. 7b is a flow chart illustrating the logic implemented by sub-routine switchFSM. SwitchFSM places INT 14 redirector 402 in the no-encrypt mode and sends an unencrypted break sequence to AT mobidem 18 when called. When SwitchFSM is called, if at step 750 the variable FSMstate is in the INIT state, SwitchFSM places FSMstate in the Wait Guard Time state at step 752 and waits the pre-guard time delay of 1 second at step 754 and returns to step 750. Since the result of the test of step 750 will now be negative, step 756 is performed. If at step 756 FSMstate is in the Wait Guard Time state, three '+' characters are sent. In addition FSMstate is set to Sent 3 Plus at step 758, and the program waits the post guard time of 2.0 second during step 759. Otherwise, step 760 is performed. If at step 760 FSMstate is in the Sent 3 Plus state, FSMstate is set to the INIT and INT 14 Redirector of TSR 301 is set to no-encrypt mode 500 at step 762. Then the program returns. This simultaneously changes the state of INT 14 redirector 402 to no-encrypt mode and places AT mobidem 18 in the command mode so that the commands issued by communication application 300 are processed by AT mobidem 18.

Figure 8:
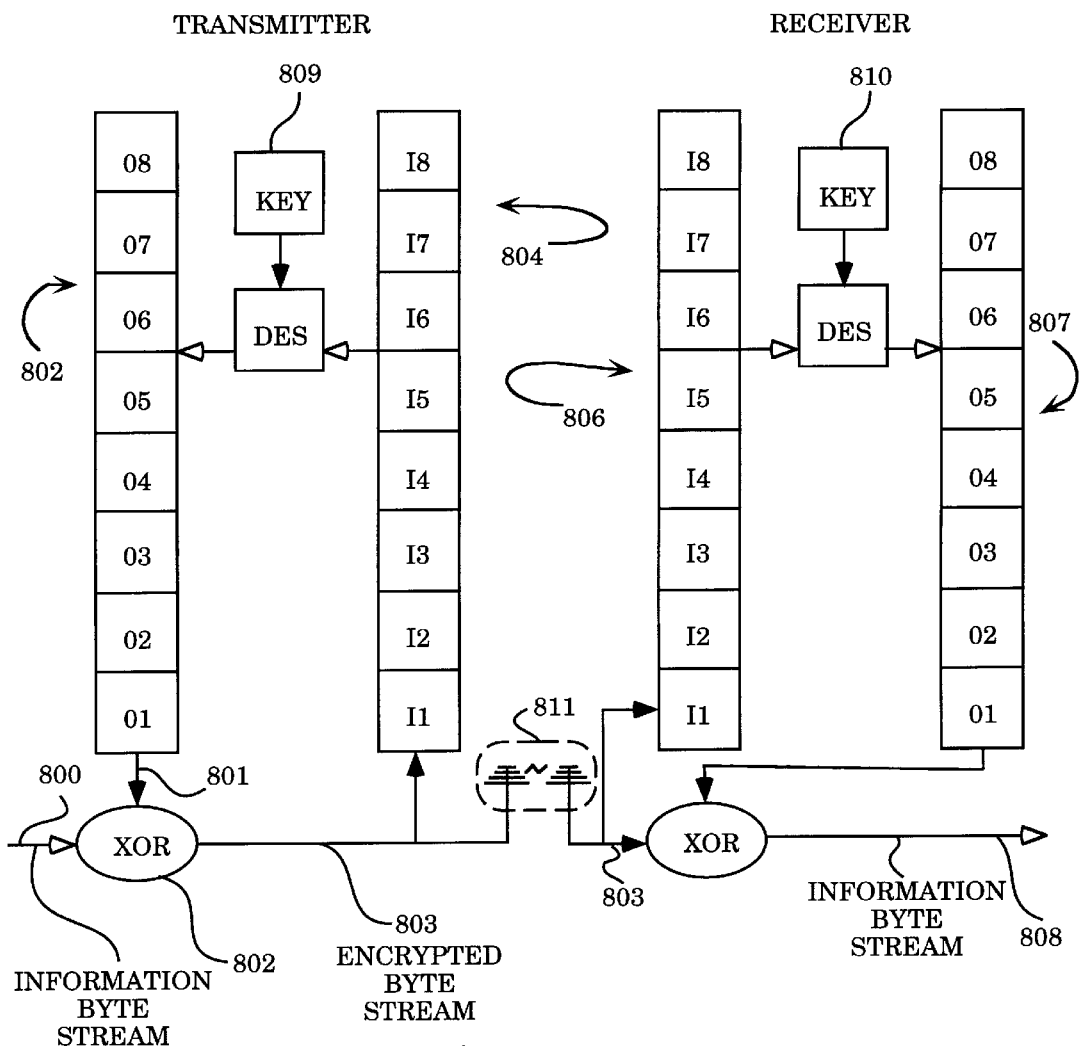
FIG. 8 is a block diagram illustrating the screen encryption and decryption method incorporated by stream DES engine 404 in one embodiment of the invention.

FIG. 8 is a block diagram illustrating the stream encryption and decryption method incorporated in stream DES Engine 404 (FIG. 4) in one embodiment of the invention when INT 14 redirector 402 (FIG. 4) is in encrypt mode 501 (FIG. 5). The algorithm takes an 8-bit plaintext character and outputs an 8-bit ciphertext character making it a perfect fit for encryption over serial transmission lines.

Both the transmitter and receiver has a 64-bit input register (I1–I8) 804 and 806) respectively, which operates as a shift register and a 64-bit output register (O1–O8) 802 and 807 respectively. When a plaintext character arrives it is EXCLUSIVE-ORed 812 with 8-bits of the output register, O1 801. Output registers O2 through O8 are never used. The character 803 thus created is both transmitted to the receiver and shifted into the input register, pushing I8 off the end. Then DES is computed on the new 64-bit input register 804 and the result is stored into the 64-bit output register 802, making it ready for the next input.

At the receiving end, the incoming character 803 is first EXCLUSIVE-ORed 814 with byte O1 in register 807 (yielding the plaintext), and then shifted into byte I1 in register 806. If the sender and receiver start out with identical input registers, they remain identical forever. In other words byte O1 at the transmitter register 802 will always be the same as byte O1 at the receiver register 807. Since the incoming plaintext character at the transmitter is being EXCLUSIVE-ORed with the same character as the incoming ciphertext character at the receiver, the output at the receiver (byte stream 800) is the original plaintext.

The important property of this stream encryption algorithm is that O1 depends on the entire history of the plaintext, so that a repeated pattern in the plaintext will not generate a repeated pattern in the ciphertext. Also, it is important to note that DES is operated in encryption modes at both the transmitter and the receiver.

The DES module 811 initializes the input shift registers with known input values 809 at the time the connection is established between the two modems. That is, whether the Carrier Detect is asserted and the Modem Connect result message is received, the DES is initialized.

The DES stream encryption method is employed because it provides high security without requiring extensive computer resources. Alternative embodiments of the invention may incorporate other symmetric key stream based encryption methods including the RC4™ encryption scheme known in the art. These alternative embodiments, which are part of the implementation of the invention, could also allow one to switch between these various encryption methods to ensure maximum repeatability. However, by their very nature, the symmetric key encryption schemes require that a key be established before communication is established. In an alternative embodiment, the symmetric encryption key can be generated after the connection is established between AT mobidem 18 and 20. This is accomplished using a public-private key encryption method well known in the art, such as the RSA encryption scheme, that allows messages to be encrypted using a public key that only allows for one way encryption. When the public-key method is employed, INT 14 redirector postpones entering the encrypt mode until the keys have been generated. While the RSA encryption scheme is an effective method for establishing a new encryption key for each communication session, it cannot be used for encrypting the actual data because it requires too much computing power to allow on the fly data stream encryption. Once the new encryption key for communication session has been established, the DES stream encryption method is employed until the communication session is concluded.

The technique to transparently encrypt and decrypt modem data has also been implemented under Windows™ as a Dynamic Link Library ("DLL"). In addition, the DLL employs RSA public-key cryptography techniques to transfer per-session encryption key securely to the remote end in a manner similar to the TSR implementation.

Thus, a method and apparatus for providing data encryption while using a standard software communications application and AT command language compatible modem is provided. It will be apparent to one skilled in the art, that various embodiments of the invention are possible other than the one disclosed. In general, the exemplary embodiment described herein is merely illustrative of the invention and should not be taken as limiting the scope of the invention.

What is claimed is:

1. A method for encrypting text data in a computer system running a communication application coupled to a communication device, comprising:

a) directing data sent from the communication application running on the computer system to the communication device without encrypting said data while an encryption application is in a first state, said directing being performed by said encryption application running on the computer system;

b) detecting a connect message and a carrier detect signal from the communication device while said encryption application is in said first state, said connect message generated by the communication device in response to establishing connection with a remote communication device;

c) changing the state of said encryption application from said first state to a remote state when said connect message and said carrier detect signal are detected;

c.1) automatically redirecting the text data to said encryption application in response to said encryption application changing state to said remote state without user intervention;

d) encrypting the redirected data to generate an outgoing encrypted data destined to said remote communication device when said encryption application is in said remote state, said encryption application sending said outgoing encrypted data to said communication device;

e) transmitting said outgoing encrypted data to said communication device;

f) detecting a break sequence from the computer system or detecting that said carrier detect signal is de-asserted when said encryption application is in said remote state; and g) changing the state of said encryption application from said remote state to said first state when said break sequence is detected or said carrier detected signal is de-asserted when transmitting said outgoing encryption data.

2. The method as set forth in claim 1 wherein the act of encrypting of the redirected data further comprises:

d.1) decrypting incoming encrypted data sent from the communication device to said computer system, said encrypted data intercepted by said encryption application prior to said encrypted data being received by the communication application.

3. The method as set forth in claim 2, further comprising:

asserting a ready/request to send signal if said ready/request to send signal is detected by said computer system as being de-asserted when said communication device is in said remote state, said assertion of said ready/request to send signal preventing a clear to send signal from being de-asserted.

4. The method as set forth in claim 3, wherein the encrypting of the redirected data comprises:

generating a DES data by performing a DES encryption operation on an encryption key and an initialization data.

5. The method as set forth in claim 4 further comprising:

generating said outgoing encrypted data by performing an exclusive-or operation on said DES data and said text data; and generating a next DES data by performing a DES encryption operation on said encryption key and said outgoing encrypted data.

6. The method as set forth in claim 1, further comprising providing symmetric key stream based encryption methods.

7. A computer system coupled to a communication device, comprising:

means for detecting a connect message and a carrier detect signal from the communication device, said connect message generated by the communication device in response to establishing connection with a remote communication device; and means for automatically encrypting said text data being sent from a microprocessor application running on said computer system to the communication device responsive to said means for detecting said connect message and said carrier detect signal and without user intervention, said encrypting being disabled when a break sequence is detected or when said carrier detect signal is de-asserted from the computer system, said encrypting generating an outgoing encrypted data.

8. The computer system as set forth in claim 7, further comprising:

means for decrypting incoming data sent from the communication device to said microprocessor application.

9. The computer system as set forth in claim 8, further comprising:

means for detecting the break sequence sent by said microprocessor application to the communication device, said means for detecting said break sequence operating while said connection has been established.

10. The computer system as set forth in claim 9, wherein said means for encrypting comprises:

means for generating a DES data by performing a DES encryption operation on an encryption key and initialization data.

11. The computer system as set forth in claim 10 further comprising:

means for generating said outgoing encrypted data by performing an exclusive-or operation on said DES data and said text data; and means for generating a next DES data by performing a DES encryption operation on said encryption key and said outgoing encrypted data.

12. The computer system as set forth in claim 7, comprising means for symmetric key stream based encryption.

13. A computer system coupled to a communication device compatible with the AT command set comprising:

a microprocessor running an encryption application, said encryption application detecting a connect message and a carrier detect signal from said communication device when said encryption application is in a first state, said connect message generated by said communication device in response to establishing communication with a remote communication device, said encryption application changing from said first state to a remote state when said connect message and said carrier detect signal is detected, said encryption application automatically encrypting said text data when in said remote state, said encryption application generating an outgoing encrypted data without user intervention, said encryption application detecting a break sequence or a de-asserted carrier detect signal from the computer system when in said remote state, and said encryption application changing from said remote state to said first state when a break sequence or said de-asserted carrier detect signal is detected.

14. The computer system of as set forth in claim 13, wherein:

said encryption application decrypts data sent from the communication device to said computer system.

15. The computer system as set forth in claim 14, wherein:

said encryption application asserting a ready/request to send signal if said ready/request to send signal is detected by said computer system as being de-asserted when said communication device is in said remote state.

16. The computer system set forth in claim 15, wherein:

said encryption application generates a DES by performing a DES encryption operation on an encryption key and initialization data.

17. The computer system set forth in claim 16, wherein:

said encryption application generates said outgoing encrypted data by performing an exclusive-or operation on said DES data and said plain text data; and said encryption application generates a DES data stream to be encrypted by performing a DES encryption operation on said encryption key and said outgoing encrypted data.

18. A machine readable medium having embodied thereon a computer program for processing by a machine having a communication device, the computer program comprising:

a communication application to signal the communication device to establish a logical connection with a remote communication device; and an application to interrupt an operation by the communication application, to examine data being loaded into a buffer for subsequent transmission over the logical connection, to place the machine into an encrypt mode when a connect message is detected and a carrier detect signal is asserted for encrypting the data before being loaded into the buffer, and to place the machine into a non-encrypted mode when either the carrier signal is de-asserted or a special break sequence is detected.

19. The machine readable medium as set forth in claim 18, wherein the application, being a terminate and stay resident program, comprising:

an interrupt driven serial port driver module to provide an Application Program Interface for handling interrupts and reading or writing information from a serial port;

an encryption engine; and a redirector module in communication with the interrupt driven serial port driver module to receive data from the interrupt driven serial port driver and to determine whether the data is passed through the encryption engine to produce encrypted data before being provided to the buffer.

20. The machine readable medium as set forth in claim 19 wherein the interrupt driven serial port driver prevents a deadlock situation, caused when the communication device no longer receives data from the communication application and the output queue of the communication application is full, by asserting a signal allowing all data sent by the communication application to be written to the communication device when the communication device is in a command mode.

21. The machine readable medium as set forth in claim 18 wherein the application does not place the machine into the encrypt mode if no logical connection is established.

* * * * *